United States Patent [19]

Hashimoto

[11] 4,091,882
[45] May 30, 1978

[54] DRILLING TOOL

[76] Inventor: Fujio Hashimoto, 41-10, Minami Magome 1-chome, Ota-ku, Tokyo, Japan, 143

[21] Appl. No.: 758,151

[22] Filed: Jan. 10, 1977

[30] Foreign Application Priority Data

Jan. 14, 1976 Japan ................................. 51-3610

[51] Int. Cl.² .............................................. E21B 9/26
[52] U.S. Cl. .................................... 175/286; 52/160; 85/68; 175/354
[58] Field of Search ............... 175/202, 263, 280, 279, 175/284, 286, 287, 289, 394, 385; 85/68; 145/114.5; 52/160

[56] References Cited

U.S. PATENT DOCUMENTS

| | | | |
|---|---|---|---|
| 833,240 | 10/1906 | Potter | 175/289 |
| 1,822,216 | 9/1931 | Hartson | 175/286 X |
| 2,506,474 | 5/1950 | Tilden | 175/394 |
| 2,511,650 | 6/1950 | Robinson | 175/287 X |
| 2,692,758 | 10/1954 | Curry et al. | 175/289 |

Primary Examiner—Ernest R. Purser
Assistant Examiner—Richard E. Favreau
Attorney, Agent, or Firm—Blanchard, Flynn, Thiel, Boutell & Tanis

[57] ABSTRACT

A drilling tool which comprises: a cylindrical structure having a spiral groove provided on the outer surface thereof and at least one elongated rectangular through-hole provided in the lower portion thereof; a tip which is loosely fitted into said through-hole in such a manner that a cutting edge of said tip faces outside, the number of said tips being equal to the number of said through-holes; a tip guide bar having a head portion and a taper slit which is tapered downwardly starting from a part of the lower surface of said head portion so as to accommodate said tip therein, said part being in the vicinity of the axial line thereof, said tip guide bar being inserted into the lower end portion of said cylindrical structure in such a manner that said tip is pushed outwardly by the tip guide bar, said tip guide bar being engaged with the upper and inner portion of said tip so that said tip guide bar is slidably connected to said cylindrical structure; and a taper shank inserted into the upper end portion of said cylindrical structure and fixedly fastened thereto so as to be held by a motor-driven drill.

1 Claim, 9 Drawing Figures

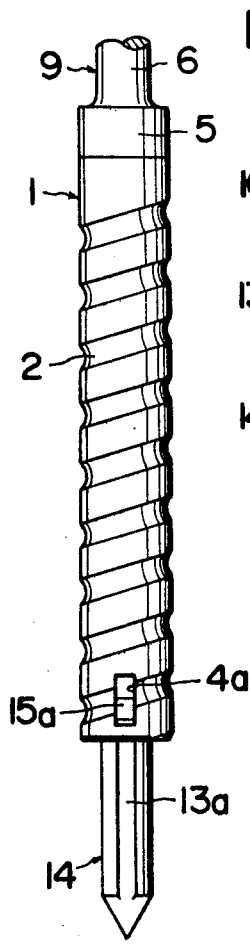
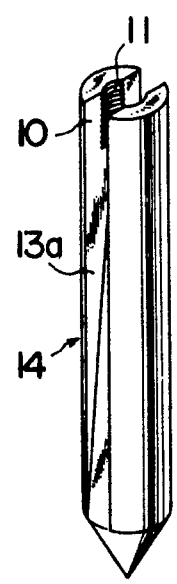
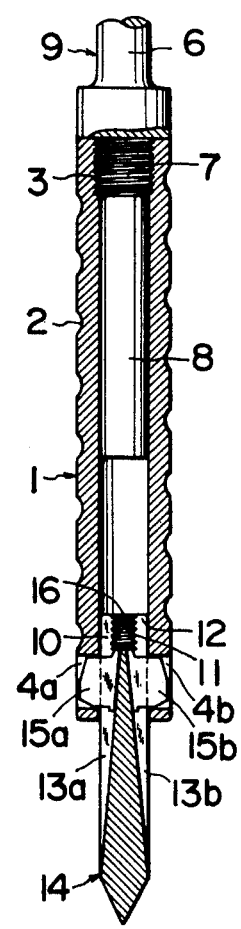
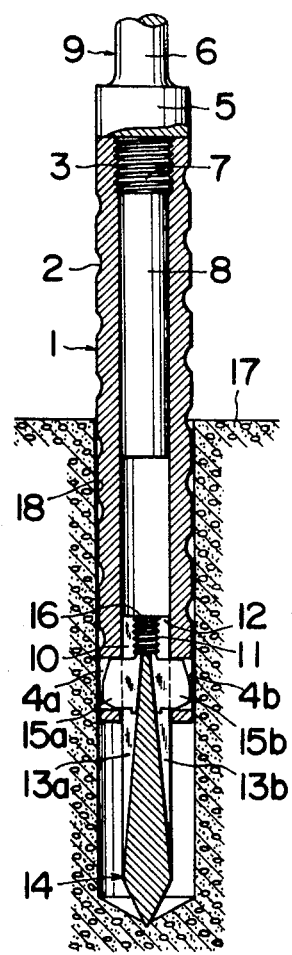

FIG. 7
FIG. 8
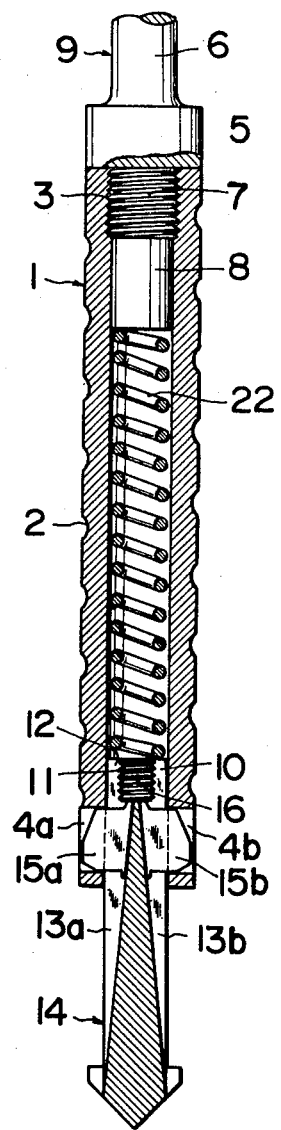
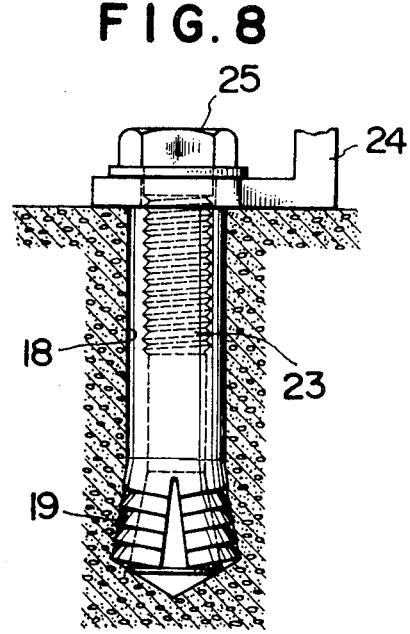

DRILLING TOOL

FIELD OF THE INVENTION

This invention relates to drilling tools for drilling holes in base materials such as concrete beds or rock-beds in which anchor bolts are imbedded mainly with synthetic resin adhesive.

BACKGROUND OF THE INVENTION

In the case of imbedding an anchor bolt with synthetic resin adhesive in a base material such as a concrete bed or a rock-bed, a hole having a predetermined diameter is bored to a predetermined depth in the base material with a motor-driven drill. Then, a synthetic resin adhesive, or a so-called "resin capsule" obtained by filling a container, for example a glass tube, with resin, a curing accelerator, and aggregate is inserted into the hole, and thereafter the anchor bolt is driven into the hole by being rotated and hammered by a hammer drill or a rock drill and is fixedly secured therein when the synthetic resin is cured.

In this case, the hole drilled is straight and the diameter of the hole is greater than that of the anchor bolt. For instance, for an anchor bolt 16 mm in diameter, the diameter of a hole to be drilled is 19 mm. Therefore, in the case where the adhesion of the resin adhesive to the wall of the hole is incomplete because of the undesirable variations caused in the anchor bolt imbedding work, or in the case where the base material is somewhat brittle, a predetermined pull-out strength cannot be obtained. In this case, the anchor bolt may be pulled out by the weight or vibration of a structure connected thereto, which may lead to hazards. This can be prevented by expanding the lower portion or bottom of the hole and providing there an expanded block obtained by adhering the anchor bolt to the wall of the hole, because even if the adhesion of the synthetic resin to the wall of the hole is somewhat inadequate or even if the base material is somewhat brittle, a distributed load is applied to the base material such as concrete or rock-bed when a load is applied to the anchor bolt, and therefore the predetermined pull-out strength is not decreased at all. In order to carry out such a method of imbedding anchor bolts as described above, it is necessary to provide a drilling tool with which a hole having its lower end portion expanded and tapered can be readily and positively drilled.

Accordingly, an object of the invention is to provide a drilling tool with which a tapered hole such as described above can be readily and positively drilled.

BRIEF DESCRIPTION OF THE DRAWINGS

FIG. 1 (a) is a front view showing one example of a drilling tool according to this invention.

FIG. 1 (b) is a perspective view illustrating a tip guide bar employed in the drilling tool.

FIG. 2 is a longitudinal sectional view showing the drilling tool.

FIGS. 3 and 4 are also longitudinal sectional views illustrating states of the drilling tool in use.

FIG. 7 is a longitudinal sectional view illustrating another example of the drilling tool according to the invention.

FIG. 8 is a longitudinal partial sectional view illustrating an anchor bolt.

DETAILED DESCRIPTION

Figure 4:
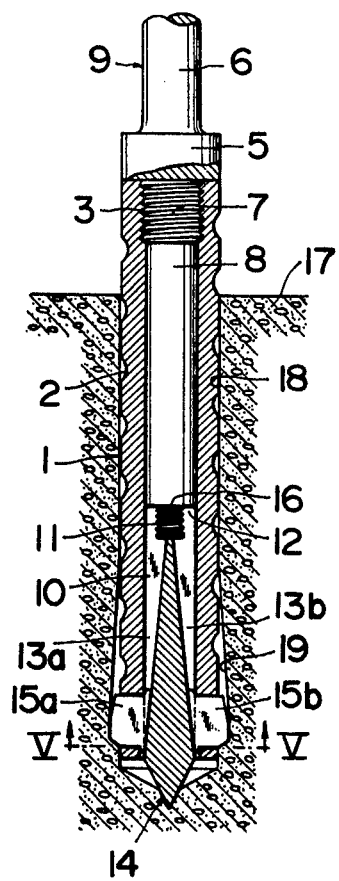

One example of a drilling tool according to this invention will be described with reference to the accompanying drawings. As is shown in FIGS. 1(a) through 5, the drilling tool comprises a cylindrical tubular structure 1 on the outer surface of which a spiral groove 2 is provided, and a female thread 3 is formed on the inner surface of the cylindrical tubular structure at the upper portion thereof. In addition, longitudinally elongated rectangular through-holes 4a and 4b are provided in the lower portion of the cylindrical tubular structure 1 in such a manner that those through-holes communicate with each other. The drilling tool according to this invention further comprises a tapered shank 9 having a rod 6 extending upward from a flange 5 and a supporting rod 8 extended downward through a male thread portion 7 from the flange 5.

A slit 10 which is to be confronted with the through-holes 4a and 4b is provided in the upper end portion of a tip bar 14, the lower end portion of which is formed conical. This bar has a head portion 12 at the center of which a female thread hole 11 is formed. Tapered slits 13a and 13b are formed in continuity with the top slit 10 in such a manner that they are inclined downward. Thus, the tip guide bar 14 is formed for pushing out tips 15a and 15b (described later). After the tips 15a and 15b are loosely fitted into the through-holes 4a and 4b in such a manner that the edges of the tips are positioned in the through-holes, the guide bar is inserted into the cylindrical tubular structure 1 in such a manner that the inner part of the tip 15a is inserted into the taper slit 13a while the inner part of the tip 15b is inserted into the taper slit 13b. Then a male screw part 16 is screwed in the female thread hole 11 of the head portion 12, so that the tips 15a and 15b are slidably retained within the holes 4a and 4b. Then, the supporting rod 8 of the tapered shank 9 is inserted into the cylindrical structure 1 and is fixedly secured thereto by screwing the male thread portion 7 in the female thread 3 of the cylindrical structure. Thus, the drilling tool according to the invention is assembled.

Figure 6:
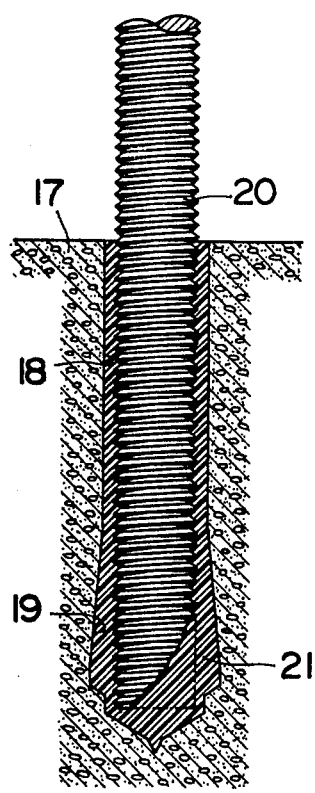
FIG. 6 is a longitudinal sectional view showing an imbedding hole drilled with the drilling tool.
Figure 5:
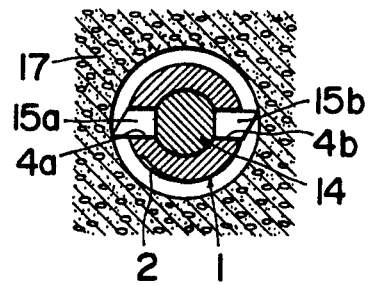
FIG. 5 is a sectional view taken along live V—V in FIG. 4.

In the case of forming a tapered hole by using the drilling tool thus provided, as is shown in FIG. 3, the drilling tool is held through the tapered shank 9 by a motor drill and is inserted into a straight hole 18 formed by drilling, for instance, in a concrete base material 17. In this operation, when the conical end of the tip guide bar 14 reaches the bottom of the drilled straight hole 18, the tips 15a and 15b are moved downward in the hole while being pushed outwardly as they slide along the respective taper slits 13a and 13b due to downward movement of the structure 1, whereby the wall of the straight hole 18 is scraped by the tips. In this case, the chips of concrete are moved upward through the spiral groove 2 and are discharged outside. Then, if under the conditions that, as shown in FIG. 4, the upper end of the head portion 12 of the tip guide bar 14 is in contact with the lower surface of the supporting rod 8 of the tapered shank 9, the motor drill is pulled upward, and the tip guide bar 14 is moved downward by its weight, as a result of which the tips 15a and 15b are pushed inwardly by the upper straight wall portion of the hole 18. Thus, an imbedding hole 19, as shown in FIG. 6, is expanded at the lower portion of hole 18 for receiving an anchor bolt. Now, the anchor bolt can be imbedded in the hole 19 according to a conventional method. In FIG. 6, reference numeral 20 designates an anchor bolt, and 21 the adhesive. The imbedding hole is suitable for not only imbedding an anchor bolt with adhesive but also imbedding an expansion-type anchor bolt, as shown in FIG. 8. That is, 23 in FIG. 8 is an expansion anchor holding tightly the member 24 of the container or container material and the like, a top end of said anchor 23 is expanded at an expanded portion 19 formed in the lower portion of a straight hole 18 and thus it is possible to obtain a remarkable pull-out strength.

Another example of the drilling tool according to the invention is shown in FIG. 7. The supporting rod 8 is made shorter and an elastic spring 22 is inserted between the tapered shank 9 and the tip guide bar 14 so that when the motor drill is pulled upward after completion of drilling a hole, tips 15a and 15b can be positively pushed inwardly and the tip guide bar 14 can also be positively moved downward.

In this invention, the dimensions of the expanded portion of the imbedding hole can be freely varied by changing the inclination degree of the tapered slits. The invention has been described with reference to the case where the number of tips is two; however, the number of tips may be three or four. In this connection, it goes without saying that the number of tapered slits provided in the tip guide bar must be equal to the number of tips.

As is apparent from the above description, with the drilling tool according to the invention, a hole expanded at its lower portion can be drilled for fixedly holding an anchor bolt with adhesive therein. Therefore, when loaded, a distributed load effect is obtained and the pull-out strength can be increased. Thus, a hole having its lower end portion expanded can be readily and positively drilled with the drilling tool according to the invention.

The embodiments of the invention in which an exclusive property or privilege is claimed are defined as follows:

1. A drilling tool which comprises:
   a cylindrical structure having a spiral groove provided on the outer surface thereof and at least one elongated transversely extending through-hole provided in the lower portion thereof;
   a tip which is loosely fitted into said through-hole in such a manner that a cutting edge of said tip faces outside, the number of said tips being equal to the number of said through-holes;
   a tip guide bar having a head portion and a taper slit which is tapered downwardly starting from a part of the lower surface of said head portion so as to accommodate said tip therein, said part being in the vicinity of the axial line thereof, said tip guide bar being inserted into the lower end portion of said cylindrical structure in such a manner that said tip is pushed outwardly by said tip guide bar, said tip guide bar being engaged with the upper and inner portion of said tip so that said tip guide bar is slidably connected to said cylindrical structure;
   a shank inserted into the upper end portion of said cylindrical structure and fixedly fastened thereto and adapted to be held and driven by a motor-driven drill; and
   an elastic spring inserted between said tip guide bar and said shank.

* * * * *